Oct. 15, 1963 S. S. CLARK 3,106,869
MILLING MACHINE
Filed Nov. 7, 1960 2 Sheets-Sheet 1

Samuel S. Clark
INVENTOR.

BY Browning, Simms,
Hyer & Cickenroht
ATTORNEYS

Oct. 15, 1963  S. S. CLARK  3,106,869
MILLING MACHINE
Filed Nov. 7, 1960  2 Sheets-Sheet 2
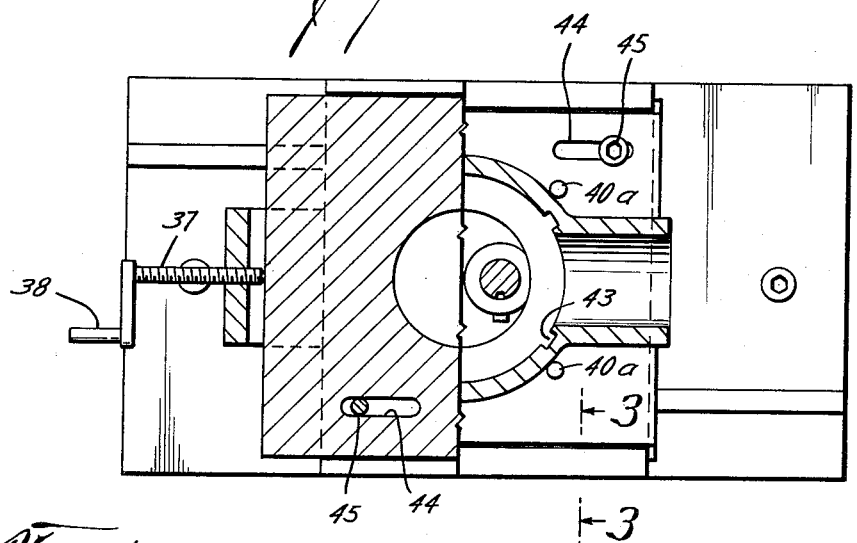
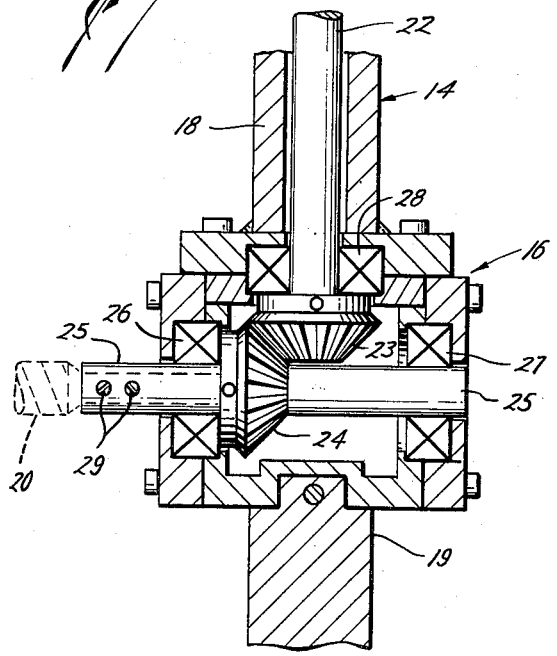
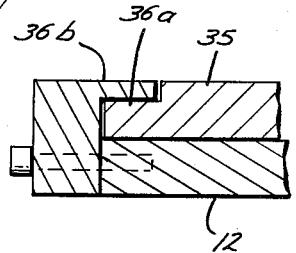
Samuel S. Clark
INVENTOR.
BY Browning, Simms,
Hyer & Eickenroht
ATTORNEYS

United States Patent Office 3,106,869
Patented Oct. 15, 1963

3,106,869
MILLING MACHINE
Samuel S. Clark, Houston, Tex., assignor to
Keystone Valve Corp., Houston, Tex.
Filed Nov. 7, 1960, Ser. No. 67,597
3 Claims. (Cl. 90—13)

This invention relates to milling machines and more particularly to pattern controlled milling machines.

It has been found generally that in the milling of grooves which vary in direction of cut in the internal surfaces of cylindrical bodies with a degree of precision required to make the cut produced therein accurate, both as to the depth of cut and its configuration, requires the use of complicated and expensive milling machines and correspondingly expensive patterns by which the machine may be controlled. An example of such problem is encountered in the machining of O-ring grooves about the ports in the body of a cylindrical plug valve.

A valve body of a cylindrical plug valve generally comprises a casting which is provided with a plurality of inlet and outlet ports that may be internally threaded or provided with other suitable coupling means for connection of conduits thereto. The casting is provided with a cylindrical chamber in which is housed a cylindrical valve plug having passageways for selectively interconnecting the ports in the body. A fluid seal is provided between the body and plug by an annular seal ring positioned with a groove in the body that encircles the ports. This seal is most commonly an O-ring that assumes a concave-convex form when positioned within the groove. In such instance, the groove in which the O-ring is contained within the inner surface of the body of the plug valve must be machined to a given constant depth into the surface of the valve body and also to such circular configuration that the O-ring will be properly positioned therein to function in cooperative fluid sealing relationship between the plug and the body. Thus, the requirements of such milling operation are (1) the groove must be cut to a uniform width and constant depth in the inner surface of the plug valve body with its sidewalls substantially perpendicular to the said body surface, and (2) the groove must have the proper annular configuration so that the O-ring can function properly in the final combination of the plug and body of such plug valve.

The type of milling machine preferable for such milling operation would be one in which the cutter may cut in any direction of movement, is operated perpendicularly to the work surface at all times and at a constant radial relationship to the radius of the internal surface of the plug valve body. It is desirable that the path of the cutter, both angularly and axially, be controlled by a master pattern. Secondly, this machine and the master pattern should be inexpensive to construct and adapted to mass production techniques, especially that of utilizing unskilled production personnel.

It is therefore an object of the present invention to provide a milling machine that can produce a circumferential cut at a constant radius and that may be moved angularly and axially with relationship to the concave surface of a cylindrical member.

Another object is to provide a milling machine that is controlled by a pattern capable of producing O-ring grooves about the ports and in the interior surface of a cylindrical plug valve body.

A further object is to provide a milling machine that is simple in construction, easily operated by unskilled labor and that can produce circumferential cuts of a circular nature that has heretofore required rather expensive milling machines and correspondingly expensive master pattern.

Another object of the present invention is to provide a milling machine in which the cutter perpendicularly faces the inner cylindrical surface of a plug valve body and may be moved circumferentially at a constant radius thereto while it is moved angularly and axially thereon to produce grooves of a non-planar configuration.

Yet another object is to provide a milling machine in which the O-ring groove about the ports of cylindrical plug valve bodies is produced in one continuous cut about each such port to any given desired depth without repeating the cutting cycle and where the groove has sidewalls perpendicular to the body surface.

These and other objects will become more apparent when read in conjunction with the following detailed description and the attached drawings of a preferred illustrated embodiment of the present invention wherein:

FIG. 2 is a section taken along line 2—2 of FIG. 1;

FIG. 3 is a section taken along line 3—3 of FIG. 2; and

FIG. 4 is a section taken medially through the milling head shown in FIG. 1.

Figure 1:
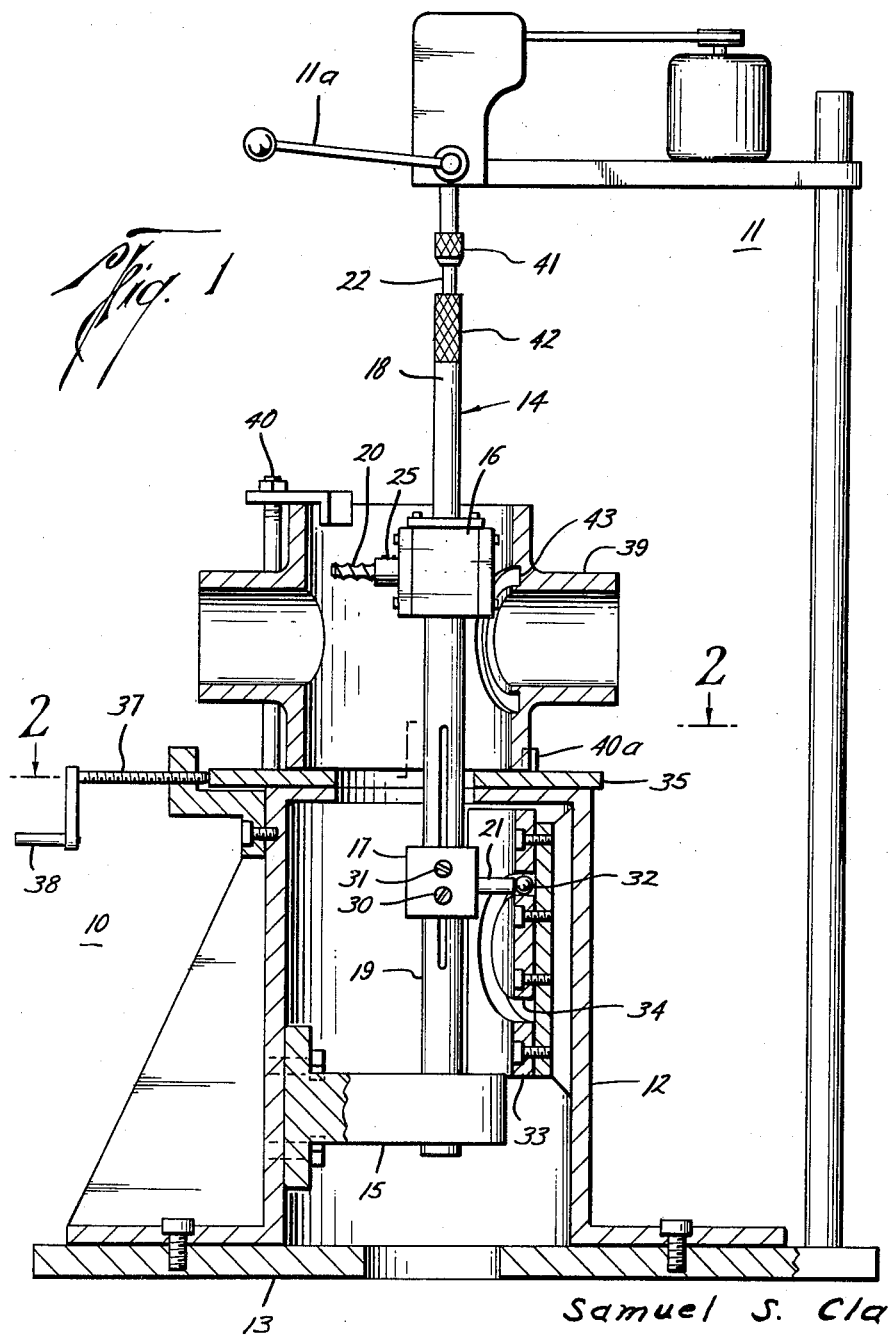
FIG. 1 is an elevation partially in section of an illustrative embodiment of the present invention.

The objects of the present invention are achieved by a milling machine, as specifically illustrated and described hereafter, which comprises a milling head mounted on a control member and having a cutter extending from the head radially with respect to the axis about which such control member may rotate and support means mounting the control member for both angular and axial movement. Such cutter should be of a character capable of cutting not only in a direction laterally with respect to its axis, but also in a direction parallel to its axis. A means is provided for operably positioning a body, such as a cylindrical plug valve body to be worked, in a position with its axis approximately normal to the cutter axis and parallel to the control member axis. Also, the machine is rendered pattern-controlled by a pattern stationary with respect to the cutter and having an outline thereon to be reproduced in such body. A tracing finger is mounted on the control member and adapted to cooperate with the outline of such pattern. A means is provided whereby the control member may be moved both axially and longitudinally so that the tracing finger will follow the outline of the pattern and control the movement of the cutter. Thus, the cutter can reproduce the outline of the pattern in a body that is operably positioned with respect thereto.

Referring to the drawings, there is shown a preferred illustrative embodiment of the present invention. In FIG. 1 there is shown a pattern-controlled milling machine generally designated by the numeral 10 connected to chuck 41 of a drill press 11 which may be conventional and which serves as a prime mover for the milling machine. The drill press 11 is provided with an arm 11a for reciprocating its chuck 41.

The milling machine 10 is provided with a support 12 which is secured to the base 13 of the drill press 11. A control member 14 is vertically disposed relative to support 12 and is carried in a bearing 15 at its lower extremity that assists in supporting the control member for angular and axial movements, as will be fully described hereafter. The bearing 15 is mounted on the support 12. The drill press spindle provides another similar bearing at the upper extremity of control member 14. The control member 14 has mounted thereon, a milling head 16 and a tracing finger carrier 17.

The control member 14 is basically comprised of a cylindrical control sleeve 18 which extends vertically above milling head 16, and a guide member 19 which extends vertically below head 16 but in axial alignment with sleeve 18.

A cutter means 20 extends radially outwardly from control member 14 and in the embodiment illustrated takes the form of an end mill. End mills are cutters with teeth on a circumferential surface and on one end. The teeth may be parallel to the axis of rotation or helical, and either right or left hand. The particular arrangement of teeth will, of course, depend upon the direction in which the end mill is rotated, the material being worked and the speed at which it is worked. Other types of cutters, however, may be used as long as they are capable of milling a groove in a work surface which is transverse to the cutter axis. The cutter is provided with teeth extending parallel to its axis of rotation where the sidewalls of the groove to be cut are to be perpendicular to the work surface of the valve body. The cutter means 20 is adapted to be rotated by a drive shaft 22 driven by a prime mover, such as drill press 11. For convenience, the control sleeve 18 is concentrically mounted on the drive shaft 22.

Referring to FIG. 4, the shaft 22 extends into the interior of the milling head 16 and has secured to its extremity within the head, a bevel gear 23. Bevel gear 23 is adapted to mesh with and drive a second complementary bevel gear 24 that is carried on a spindle 25. Spindle 25 is mounted for friction-free rotation by means of bearings 26 and 27 secured to the sidewalls of milling head 16, and likewise shaft 22 is provided with a bearing 28 in milling head 16. Thus, it can be seen by rotating the shaft 22 in the particular desired direction with respect to the milling head, the cutter means 20 will be operatively rotated thereby on its own axis. The cutter means 20 may be releasably secured to spindle 25 by means of set screws 29 so that the cutter means may be readily adjusted as to its length which extends radially from the axis of the control member beyond the terminus of spindle 25. This provides a convenient method to set the depth of a circumferential cut produced by the cutter means. Thus, a cut may be made to a given radius from the axis of the control member.

The tracing finger carrier 17 is releasably mounted on guide member 19 and is secured thereto by means of set screw 30 so that it may be moved axially thereon. Tracing finger 21 is releasably secured to tracing finger carrier 17 by means of set screw 31, and its position and the distance with which it extends radially outwardly from guide member 19 can be conveniently and readily set. A ball 32 is rotatably mounted on the outer extremity of tracing finger carrier 17, preferably by low friction bearing means so that it is free to rotate. The tracing finger 21 may thereby be moved relatively friction-free over an outline carried by a pattern, as will be more fully described hereafter.

A pattern 33 is secured to support 12 and is provided with an outline 34 which is to be reproduced in a work piece or body by cutter means 20. The pattern is secured to support 12 and is positioned with respect to tracing finger 21 in such a manner that the tracing finger 21, and in particular ball 32 rotatably mounted thereon, may engage the outline 34 and thereby control angular and axial movement of the finger 21. The pattern 33 is preferably of a member of cylindrical configuration resembling that portion of the cylindrical plug valve body desired to be worked. The outline 34 provided in the pattern takes the form of a groove in which the ball 32 of tracing finger 21 is received and guided. Preferably it is exactly in the same annular shape of the groove in which the O-ring will reside in the valve body. The groove of outline 34 is, of course, concave-convex rather than planar. Thus, it can be seen that the movement of control 14 can be used to move tracing finger 21 about outline 34 and will result in the cutter means 20 reproducing such movement.

A work table 35 is supported for movement at right angles to the axis of the control member on support 12 by means of a tongue and groove arrangement 36a and 36b, as can be seen in FIGS. 2 and 3. An adjustment means in the form of a hand-operated screw 37 is provided whereby the table can be moved at right angles relative to the control member 14. The screw 37 may be provided with an operating handle 38 to facilitate manual adjustment of the work table. The movement of the table 35 may be conveniently limited by means of a slot 44 and bolt 45 arrangement shown in FIG. 2.

A body to be worked, taking the form of a cylindrical plug valve body 39, is releasably secured to work table 35 by means of screw clamps 40; however, other means for releasably securing the body 39 in position on the work table may be provided. Centering or locating pins 40a may be provided to exactly position body 39 on table 35.

It is, of course, apparent that exact angular relationship between the cutter means 20 and the tracing finger 21 is not critical, nor must it be at any given alignment; however, it is necessary that the tracing finger and cutter means be in a fixed axial relationship so that the tracing finger 21 is at the same part of the outline 34 of pattern 33 as the cutter means 20 will be on the body 39. For example, when the outline 34 takes the form of a circular O-ring groove in pattern 33 and the tracing finger 21 is at either the top or bottom of the outline, then the cutter means must also be positioned with respect to the work body at this same part of the desired groove. The tracing finger carrier 17 may be easily adjusted by positioning the cutter means with respect to the valve body, releasing set screw 30 and moving the carrier angularly and axially on guide member 19 until the tracing finger 21 is properly positioned with respect to the outline 34. With the cutter means 20 and tracing finger 21 properly positioned, the device is operated as follows:

The chuck 41 of drill press 11 is released from shaft 22 so that body 39 may be slipped over the control member 14 and positioned against locating pins 40a upon work table 35. The body 39 is positioned on the work table so that the axis of the port of the valve body is parallel to the axis of the cutter means 20 with the tracing finger 21 at the top or bottom of the outline 34 in pattern 33. The body 39 is then clamped to table 35 by means of clamps 40. Chuck 41 is secured over shaft 22 to provide a drive connection between the drill press and the cutter means. The prime mover is activated causing shaft 22 to rotate, thereby operably rotating cutter means 20. Under these conditions, the screw 37 is operated, causing the work table to move at right angles relative to control member 14 and the table is moved by such adjusting means until the valve body 39 is in co-axial alignment with the axis of control member 14. At this time cutter means 20 should have engaged the internal surface of body 39 to cut or mill it to the desired depth. If this is not the case, then the table 35 may be retracted by means of drive screw 37 and the depth of the cut can be adjusted after releasing set screw 39 by moving cutter means 20 radially in spindle 25. With the cutter means 20 engaging the body 39 and cutting to the proper depth, the knurled portion 42 of control member 14 and the arm 11a of the drill press 11 are grasped by the operator who exerts angular and axial pressure on the member 14 and arm 11a as is required to cause tracing finger 21 to move about the entire circumference of outline 34 in pattern 33. This, of course, moves cutter 20 about the interior surface of body 39, reproducing outline 34 in the form of a groove 43 in the interior surface of body 39. Obviously the end cutting parts of the cutter means and the bottom of the groove formed thereby will lie in a surface coaxial with the control member, and the center line of such cutter means and hence of the groove it forms will intersect said control member axis.

This operation permits the O-ring groove 43 to be cut to its maximum depth about its entire circumference in the interior of valve body 39 in one operation. It is preferable to perform this operation in one cut, as it is found that making repeated shallower cuts in the interior of body 39 until the desired depth is reached will produce a series of steps, or the like, in the groove which tends to damage an O-ring contained therein. After completion of the O-ring groove about one part of the valve body, the table 35 is retracted to disengage cutter means 20 from the body 39 and then clamps 40 may be released and the body 39 rotated to position another portion of the inner surface of the body with respect to cutter means 20, at which time the clamps 40 may be retightened and the process of cutting the groove repeated.

It is apparent that the cutter means can be manually guided about an outline formed on the surface of a body operably positioned thereto to produce a corresponding cut therein without using the pattern control heretofore described. However, the most beneficial results of the present invention are achieved when pattern control of the cutter means is utilized.

Thus, there has been herein provided a novel milling machine which can be pattern controlled and in which the cutting means may be moved circumferentially at a constant radius, and additionally, axially with respect to the work surface so that a non-planar groove may be cut into a cylindrical surface at a given radius to a constant depth. The only critical aspect of the present invention is that the control member axis of rotation and the axis of the cylindrical body being milled coincide during operation and that the difference between the two radii (that of the cutter means being greater than the interior cylindrical surface of the body) be the depth of the groove to be reproduced in the body.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A milling machine for cutting a groove extended both circumferentially and longitudinally of a predetermined fixed axis, the bottom extremity of which groove is at all points equidistant from said axis and whose sides in any given cross section transverse to the groove will be symmetrical relative to a radial line from said fixed axis through the center of the groove, comprising, a support fixed relative to said axis, a control member rotatably and slidably mounted on said support for rotation about and movement along said fixed axis during the cutting of such groove, means on said control member for mounting an end mill cutter for rotation about its own axis with the end of said cutter projecting laterally from said predetermined axis, means on said cutter holder for rotating said cutter mounting means about such cutter axis, and means for operably fixedly positioning a work body on said support with the locus of the intended radial extremity of the cutter in the work body coaxially of said control member.

2. A milling machine as in claim 1 wherein said means for moving the control member includes a tracing finger fixed on the control member and a grooved pattern fixed on said support, the groove in said pattern being positioned to receive said finger and restrict its rotary and axial movement and that of the control member and the cutter mounting means to the desired outline of cut.

3. A milling machine as in claim 1 wherein the means for operably fixing a work body includes means operable while said cutter holder is rotating on its own axis and otherwise stationary for moving a work body along a path parallel to the axis of the holder into position such that the locus of the intended radial extremity of the cut in the work body is coaxial with the control member.

References Cited in the file of this patent
UNITED STATES PATENTS

| | | |
|---|---|---|
| 1,589,933 | Bontempi | June 22, 1926 |
| 2,475,227 | Evans | July 5, 1949 |
| 2,768,558 | Dubosclard | Oct. 30, 1956 |
| 2,844,976 | Kasevich | July 29, 1958 |
| 2,929,299 | Jenkins | Mar. 22, 1960 |